US012694157B2

(12) United States Patent
Jia et al.

(10) Patent No.: US 12,694,157 B2
(45) Date of Patent: Jul. 28, 2026

(54) TERMINAL CHIP AND MEASUREMENT METHOD THEREOF

(71) Applicant: HUAWEI TECHNOLOGIES CO., LTD., Shenzhen (CN)

(72) Inventors: Jianwei Jia, Shenzhen (CN); Feifei Yin, Xi'an (CN); Gang Feng, Xi'an (CN); Yu Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 104 days.

(21) Appl. No.: 18/356,463

(22) Filed: Jul. 21, 2023

(65) Prior Publication Data

US 2023/0367913 A1 Nov. 16, 2023

Related U.S. Application Data

(63) Continuation of application No. PCT/CN2021/073663, filed on Jan. 25, 2021.

(51) Int. Cl.
G06F 21/00 (2013.01)
G06F 21/57 (2013.01)
G06F 21/64 (2013.01)

(52) U.S. Cl.
CPC ............ G06F 21/64 (2013.01); G06F 21/575 (2013.01); *G06F 2221/034* (2013.01)

(58) Field of Classification Search
CPC .. G06F 21/64; G06F 21/575; G06F 2221/034; G06F 21/53
See application file for complete search history.

(56) References Cited

U.S. PATENT DOCUMENTS

| | | | | |
|---|---|---|---|---|
| 2008/0235793 A1* | 9/2008 | Schunter | | G06F 21/64 |
| | | | | 718/1 |
| 2013/0125244 A1* | 5/2013 | Sugano | | G06F 21/57 |
| | | | | 726/26 |
| 2014/0089650 A1* | 3/2014 | Polzin | | G06F 21/81 |
| | | | | 713/2 |

(Continued)

FOREIGN PATENT DOCUMENTS

| | | |
|---|---|---|
| CN | 104918116 A | 9/2015 |
| CN | 108614975 A | 10/2018 |

(Continued)

OTHER PUBLICATIONS

International Search Report and Written Opinion in International Appln. No. PCT/CN2021/073663, mailed on Nov. 4, 2021, 20 pages (with English translation).

(Continued)

*Primary Examiner* — Ghazal B Shehni

(74) *Attorney, Agent, or Firm* — Fish & Richardson P.C.

(57) ABSTRACT

The present disclosure relates to a terminal chip and a measurement method thereof. In an example, a terminal chip includes a computing subsystem and a security subsystem. The security subsystem is configured to measure the computing subsystem. A boot time of the security subsystem is earlier than a boot time of the computing subsystem. The security subsystem includes an integrity verification unit configured to perform integrity measurement on data in a boot process of the computing subsystem.

20 Claims, 7 Drawing Sheets

(56) References Cited

U.S. PATENT DOCUMENTS

| | | | | |
|---|---|---|---|---|
| 2014/0281578 A1* | 9/2014 | Bennison | ............. | H04L 9/3236 |
| | | | | 713/189 |
| 2014/0325644 A1* | 10/2014 | Oberg | .................... | G06F 21/57 |
| | | | | 726/22 |
| 2018/0034793 A1* | 2/2018 | Kibalo | ................. | G06F 21/575 |
| 2018/0373878 A1* | 12/2018 | Jung | .................... | H04L 9/0894 |
| 2019/0172047 A1 | 6/2019 | Tan et al. | | |
| 2020/0082091 A1* | 3/2020 | Areno | ................ | G06F 9/45558 |

FOREIGN PATENT DOCUMENTS

| | | | |
|---|---|---|---|
| CN | 110414235 | A | 11/2019 |
| CN | 111177703 | A | 5/2020 |
| CN | 112016090 | A | 12/2020 |
| EP | 3570197 | A1 | 11/2019 |
| WO | 2019225849 | A1 | 11/2019 |

OTHER PUBLICATIONS

Extended European Search Report in European Appln. No. 21920365. 0, mailed on Feb. 8, 2024, 9 pages.

* cited by examiner

TERMINAL CHIP AND MEASUREMENT METHOD THEREOF

CROSS-REFERENCE TO RELATED APPLICATIONS

This application is a continuation of International Application No. PCT/CN2021/073663, filed on Jan. 25, 2021, the disclosure of which is hereby incorporated by reference in its entirety.

TECHNICAL FIELD

Embodiments of this application relate to the field of chips, and in particular, to a terminal chip and a measurement method thereof.

BACKGROUND

Currently, in a computing device, to ensure secure running of a computing subsystem, a trustzone technology is usually used to divide the computing subsystem into a trusted execution environment (trusted execution environment, TEE) and a rich execution environment (rich execution environment, REE). Generally, the REE may run an operating system such as Android, Linux, or windows, to support a user in running a rich application. The TEE may run a small operating system of a supplier, to support running of some key services with a high security requirement, to ensure security of the key services.

However, as a quantity of key services increases, a code amount of the TEE isolated by a trustzone increases. As a result, a trusted computing base of the TEE is becoming larger, and the TEE faces an increasingly larger attack surface. Therefore, how to ensure security of the computing subsystem becomes an urgent problem to be resolved.

SUMMARY

Embodiments of this application provide a terminal chip and a measurement method thereof. By measuring a computing subsystem, secure running of the computing subsystem can be ensured To achieve the foregoing objectives, the following technical solutions are used in embodiments of this application.

According to a first aspect of an embodiment of this application, a terminal chip is provided. The terminal chip includes a computing subsystem and a security subsystem. The security subsystem is configured to measure the computing subsystem. A boot time of the security subsystem is earlier than a boot time of the computing subsystem. The security subsystem includes: an integrity verification unit. The integrity verification unit is configured to perform integrity measurement on data in a boot process of the computing subsystem. Based on this solution, because a power-on boot time of the security subsystem is earlier than a power-on boot time of the computing subsystem, after the security subsystem is powered on and booted, the integrity measurement may be performed on the boot process of the computing subsystem, to determine whether the computing subsystem is maliciously attacked in the boot process, so that security of the boot process of the computing subsystem can be improved.

Optionally, a function of the integrity verification unit in this application may be implemented by using a hardware circuit, or may be implemented by using a software program. This is not limited in this application.

With reference to the first aspect, in a possible implementation, the security subsystem further includes: a first interaction interface, and the security subsystem accesses all resources of the computing subsystem through the first interaction interface. Based on this solution, the security subsystem may read all the resources of the computing subsystem through the first interaction interface. Therefore, after the security subsystem is booted, in a boot process of the computing subsystem, the security subsystem may read data in the boot process of the computing subsystem, and perform integrity measurement on the data, to determine whether the computing subsystem is maliciously attacked in the boot process, so that the security of the boot process of the computing subsystem can be improved.

With reference to the first aspect and the foregoing possible implementation, in another possible implementation, the integrity verification unit is further configured to perform integrity measurement on data in a running process of the computing subsystem. Based on this solution, the security subsystem may not only measure the data in the boot process of the computing subsystem, but also measure the data in the running process of the computing subsystem, so that a full life cycle of the computing subsystem can be measured, to ensure secure running of the computing subsystem.

With reference to the first aspect and the foregoing possible implementations, in another possible implementation, the integrity verification unit is specifically configured to perform integrity measurement on the data during running of the computing subsystem when the computing subsystem is switched from a rich execution environment REE to a trusted execution environment TEE. Based on this solution, the security subsystem may perform measurement when the computing subsystem is switched from the REE to the TEE, so that security of the running process of the computing subsystem can be ensured. It may be understood that the security subsystem provided in this application may not only measure the REE, but also measure the TEE, to ensure secure running of the entire computing subsystem.

With reference to the first aspect and the foregoing possible implementations, in another possible implementation, the security subsystem further includes: a timer, where the timer is configured to perform timing; and the integrity verification unit is specifically further configured to periodically perform integrity measurement on the data during running of the computing subsystem based on the timer. Based on this solution, the security subsystem may periodically measure the running process of the computing subsystem, to further ensure the security of the running process of the computing subsystem.

Optionally, the data during running of the computing subsystem may include only data during running of the TEE, or may include only data during running of the REE, or may include both data during running of the TEE and data during running of the REE. For example, when the security subsystem periodically performs integrity measurement on the computing subsystem, if a processor of the computing subsystem currently runs only a TOS, the security subsystem performs integrity measurement on the data during running of the TEE. For another example, when the security subsystem periodically performs integrity measurement on the computing subsystem, if the processor of the computing subsystem currently runs only an ROS, the security subsystem performs integrity measurement on the data during running of the REE. For another example, when the security subsystem periodically performs integrity measurement on the computing subsystem, if the processor of the computing subsystem currently runs both the ROS and the TOS, the security subsystem performs integrity measurement on the data during running of the REE and the data during running of the TEE.

With reference to the first aspect and the foregoing possible implementations, in another possible implementation, the security subsystem further includes: a shared buffer, where the shared buffer is used for communication between the computing subsystem and the security subsystem. Based on this solution, the computing subsystem may communicate with the security subsystem through the shared buffer. For example, the computing subsystem may read data from the shared buffer of the security subsystem through a second interaction interface, or may write data into the shared buffer of the security subsystem through a second interaction interface.

With reference to the first aspect and the foregoing possible implementations, in another possible implementation, the security subsystem further includes: a filter, where the filter is configured to intercept a first access operation of the computing subsystem, where the first access operation is used to request to access other resources than the shared buffer in the security subsystem. Based on this solution, the computing subsystem can access only the shared buffer of the security subsystem, and cannot access other resources than the shared buffer in the security subsystem, so as to ensure that the computing subsystem cannot read or change information in the security subsystem, thereby ensuring credibility of the security subsystem. It may be understood that, in the solution of this application, the shared buffer is a unique resource that can be accessed by the computing subsystem in the security subsystem. When the computing subsystem accesses other resources than the shared buffer in the security subsystem, the filter may intercept these access operations. For example, the computing subsystem cannot rewrite data stored in a random access memory RAM of the security subsystem.

With reference to the first aspect and the foregoing possible implementations, in another possible implementation, the filter is further configured to intercept a second access operation of the security subsystem, where the second access operation is used to request to write data into the computing subsystem. Based on this solution, the security subsystem may read all the resources in the computing subsystem, but cannot write data into the computing subsystem, to avoid exposing the data in the security subsystem to the computing subsystem, thereby further improving the credibility of the security subsystem.

With reference to the first aspect and the foregoing possible implementations, in another possible implementation, the security subsystem further includes: a read only memory ROM and a processor, where the ROM is configured to store a computer program when the security subsystem is powered on; and the processor is configured to run the computer program stored in the ROM. Based on this solution, the processor of the security subsystem executes computer program code stored in the ROM, so that the security subsystem can be booted, and it can be ensured that the security subsystem is first powered on and booted.

With reference to the first aspect and the foregoing possible implementations, in another possible implementation, the security subsystem further includes a crypto engine, where the crypto engine is configured to provide a cryptographic algorithm; and the integrity verification unit is specifically configured to invoke the cryptographic algorithm provided by the crypto engine and perform integrity measurement on the data in the boot process and the data in the running process of the computing subsystem. Based on this solution, the integrity verification unit may perform integrity measurement on the data in the boot process and the data in the running process of the computing subsystem by invoking the cryptographic algorithm, so as to determine whether the computing subsystem is maliciously attacked in the boot process or running process, thereby improving security of the computing subsystem.

With reference to the first aspect and the foregoing possible implementations, in another possible implementation, the security subsystem further includes: a random access memory RAM, where the RAM is configured to store reference values corresponding to the data in the boot process and the data in the running process of the computing subsystem. Based on this solution, whether the computing subsystem is attacked may be determined by using the reference value stored in the RAM. Optionally, the RAM may be further configured to temporarily store another information required when the security subsystem runs.

With reference to the first aspect and the foregoing possible implementations, in another possible implementation, the integrity verification unit is specifically configured to invoke the cryptographic algorithm provided by the crypto engine, calculate feature values of the data in the boot process and the data in the running process of the computing subsystem, and compare the feature values with the reference values stored in the RAM, to indicate whether the computing subsystem is attacked. Based on this solution, the integrity verification unit may determine, by comparing the feature value with the reference value stored in the RAM, whether the computing sub system is maliciously attacked.

Optionally, when the integrity verification unit invokes a hash algorithm provided by the crypto engine and calculates a feature value of data, the feature value is a hash value. When the integrity verification unit invokes a message authentication code MAC algorithm provided by the crypto engine and calculates a feature value of data, the feature value is a MAC value.

With reference to the first aspect and the foregoing possible implementations, in another possible implementation, the processor is further configured to send a first indication signal to the computing subsystem when the feature value is the same as the reference value, where the first indication signal indicates that the computing subsystem is not attacked. Based on this solution, when determining that the feature value is the same as the reference value, the security subsystem may send, to the computing subsystem, the first indication signal indicating that the computing subsystem is not attacked. Optionally, when the security subsystem determines that the computing subsystem is not attacked, the security subsystem may alternatively not send, to the computing subsystem, the first indication signal indicating that the computing subsystem is not attacked. That is, when the computing subsystem is not attacked, the computing subsystem may execute the boot or running process step by step regardless of a result of integrity measurement of the security subsystem in the boot or running process, until the computing subsystem is attacked, the security subsystem resets the computing subsystem.

With reference to the first aspect and the foregoing possible implementations, in another possible implementation, the processor is further configured to send indication information to a server when the feature value is different from the reference value, where the indication information indicates that the computing subsystem is attacked; or send a second indication signal to the computing subsystem, where the second indication signal is used to reset the computing subsystem. Based on this solution, when the security subsystem determines that the feature value is different from the reference value, the security subsystem may directly reset the computing subsystem, so as to ensure that sensitive information (for example, a key) of the computing subsystem is not leaked. The security subsystem may alternatively send the indication information to the server, to notify the server that the computing subsystem is attacked, so that a supplier can fix a vulnerability in the computing subsystem in time. Optionally, when the security subsystem determines that the computing subsystem is attacked, the security subsystem may alternatively perform another exception handling. In this embodiment of this application, only an example in which the security subsystem resets the computing subsystem when the computing sub system is attacked is used for description.

With reference to the first aspect and the foregoing possible implementations, in another possible implementation, the security subsystem further includes: a power supply clock management unit, where the power supply clock management unit is configured to perform power-on or power-off control on the security subsystem. Based on this solution, because the power supply clock management unit that manages power-on or power-off of the security subsystem is independently disposed in the security subsystem, power-on or power-off of the security subsystem may not be controlled by an external power supply management unit. Therefore, the external power supply management unit cannot perform power-off control on the security subsystem, thereby avoiding a problem that the security of the computing subsystem is reduced because measurement cannot be performed on the computing subsystem after the security subsystem is powered off.

With reference to the first aspect and the foregoing possible implementations, in another possible implementation, the processor is further configured to send a third indication signal to an external power supply management unit, where the third indication signal indicates the external power supply management unit to perform power-on or power-off control on the security subsystem. Based on this solution, the security subsystem sends the third indication signal to the external power supply management unit, so that the external power supply management unit can perform power-off control on the security subsystem only after receiving the third indication signal from the security subsystem, to ensure security of the computing subsystem in the full life cycle, thereby avoiding a problem that the security of the computing subsystem is reduced because measurement cannot be performed on the computing subsystem after the external power supply management unit powers off the security subsystem.

With reference to the first aspect and the foregoing possible implementations, in another possible implementation, the security subsystem further includes: a watchdog, where the watchdog is configured to reset the security subsystem and the computing subsystem when the security subsystem is suspended. Based on this solution, if the security subsystem is suspended, no one kicks the dog. After the watchdog times out, resetting of the entire system is performed, thereby preventing the computing subsystem from being attacked when running in an unprotected state. Optionally, the resetting the security subsystem and the computing subsystem includes rebooting the security subsystem and the computing subsystem.

According to a second aspect of an embodiment of this application, a measurement method for a terminal chip is provided. The terminal chip includes a computing subsystem and a security subsystem. The method includes: powering on and booting the security subsystem, where the security subsystem is configured to measure the computing subsystem; powering on and booting the computing subsystem after the security subsystem is booted; and the security subsystem performs integrity measurement on data in a boot process of the computing subsystem.

With reference to the second aspect, in a possible implementation, the method further includes: The security subsystem performs integrity measurement on data in a running process of the computing subsystem.

With reference to the second aspect and the foregoing possible implementation, in another possible implementation, that the security subsystem performs integrity measurement on the data in the running process of the computing subsystem includes: The security subsystem performs integrity measurement on the data during running of the computing subsystem when the computing subsystem is switched from a rich execution environment REE to a trusted execution environment TEE.

With reference to the second aspect and the foregoing possible implementations, in another possible implementation, that the security subsystem performs integrity measurement on the data in the running process of the computing subsystem includes: The security subsystem periodically performs integrity measurement on the data in the running process of the computing subsystem.

With reference to the second aspect and the foregoing possible implementations, in another possible implementation, that the security subsystem performs integrity measurement on the data in the boot process or the running process of the computing subsystem includes: The security subsystem calculates a feature value of the data in the boot process or the running process of the computing subsystem, and compares the feature value with a reference value, to indicate whether the computing subsystem is attacked.

With reference to the second aspect and the foregoing possible implementations, in another possible implementation, when the feature value is the same as the reference value, the method further includes: The security subsystem sends a first indication signal to the computing subsystem, where the first indication signal indicates that the computing subsystem is not attacked.

With reference to the second aspect and the foregoing possible implementations, in another possible implementation, when the feature value is different from the reference value, the method further includes: The security subsystem sends indication information to a server, where the indication information indicates that the computing subsystem is attacked; or the security subsystem sends a second indication signal to the computing subsystem, where the second indication signal is used to reset the computing subsystem.

With reference to the second aspect and the foregoing possible implementations, in another possible implementation, the method further includes: The security subsystem sends a third indication signal to an external power supply management unit, where the third indication signal indicates the external power supply management unit to perform power-on or power-off control on the security subsystem.

With reference to the second aspect and the foregoing possible implementations, in another possible implementation, the method further includes: The security subsystem intercepts a first access operation of the computing subsystem, where the first access operation is used to access other resources than a shared buffer in the security subsystem.

With reference to the second aspect and the foregoing possible implementations, in another possible implementation, the method further includes: The security subsystem intercepts a second access operation of the security subsystem, where the second access operation is used to request to write data into the computing subsystem.

For effect descriptions of the implementations of the second aspect, refer to the effect descriptions of the first aspect. Details are not described herein again.

According to a third aspect of an embodiment of this application, a terminal device is provided. The terminal device includes the terminal chip according to any implementation of the first aspect and an off-chip memory, and the terminal chip is configured to read data from or write data into the off-chip memory.

DESCRIPTION OF EMBODIMENTS

Figure 1:
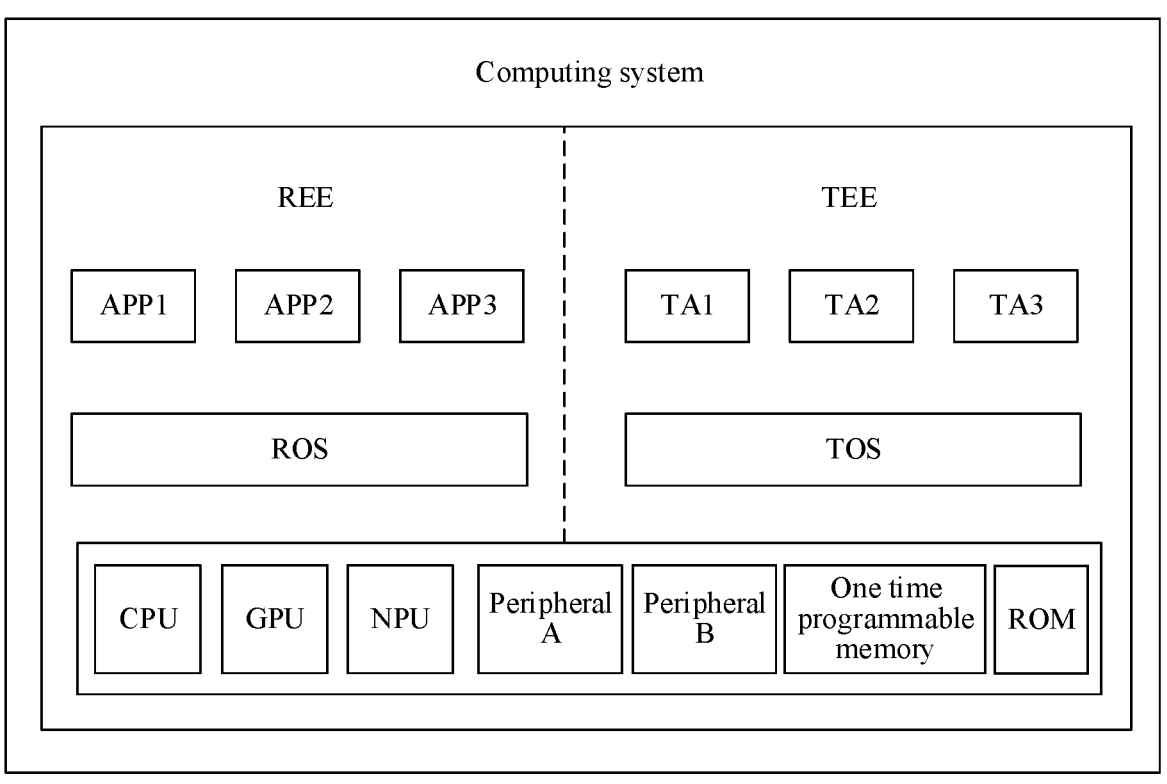
FIG. 1 is a schematic diagram of a security architecture of a computing system according to an embodiment of this application.

The following describes the technical solutions in embodiments of this application with reference to the accompanying drawings in embodiments of this application. In this application, "at least one" means one or more, and "a plurality of" means two or more. "And/or" describes an association relationship between associated objects, and represents that three relationships may exist. For example, A and/or B may represent the following cases: Only A exists, both A and B exist, and only B exists, where A and B may be singular or plural. The character "/" generally indicates an "or" relationship between the associated objects. At least one of the following items (pieces) or a similar expression thereof refers to any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural. In addition, to clearly describe the technical solutions in embodiments of this application, terms such as "first" and "second" are used in embodiments of this application to distinguish between same items or similar items that provide basically same functions or purposes. A person skilled in the art may understand that the terms such as "first" and "second" do not limit a quantity and an execution sequence. For example, in embodiments of this application, "first" in a first indication signal and "second" in a second indication signal are merely used to distinguish between different indication signals. Descriptions such as "first" and "second" in embodiments of this application are merely used for indicating and distinguishing between described objects, do not show a sequence, do not indicate a specific limitation on a quantity of devices in embodiments of this application, and cannot constitute any limitation on embodiments of this application.

It should be noted that in this application, the word such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the word such as "example" or "for example" is intended to present a relative concept in a specific manner.

Currently, in a computing device, especially in a computing device designed based on an advanced RISC machine (advanced RISC machine, ARM) architecture, a trustzone technology is usually used to divide a hardware resource and a software resource of a system on chip (system on chip, SoC) into two worlds: a secure world (secure world) and a normal world (normal world) (which may also be referred to as a non-secure world). A key service with a high security requirement may run in the secure world. A service without a high security requirement may run in the normal world. A reason why the secure world is more secure than the normal world is that fewer services run in the secure world and a trusted computing base of the secure world is far less than a trusted computing base of the normal world. Therefore, trust of the secure world is far higher than trust of the normal world. Optionally, the secure world may also be referred to as a trusted execution environment (trusted execution environment, TEE), and the non-secure world or the normal world may also be referred to as a rich execution environment (rich execution environment, REE).

For example, FIG. 1 is a schematic diagram of a security architecture of a computing system. The computing system includes an REE and a TEE. A service running in the REE does not have a very high security requirement, and a service running in the TEE has a high security requirement. As shown in FIG. 1, the REE may run a rich operating system (rich operating system, ROS) to support a user in running a rich application (application, App). For example, the REE may run an operating system such as Android, Linux, or windows, to support a user in running an application such as WeChat or Tencent video that has a low security requirement. The TEE usually runs a small operating system implemented by a supplier to support the user in running a trusted application (trusted application, TA). The operating system may be referred to as a trusted operating system (trusted operating system, TOS). For example, the TEE may run an operating system of the supplier, to support the user in running a program such as a signed APP, a payment APP, facial recognition, fingerprint recognition, password processing, data encryption and decryption, security authentication, or key management that has a high security requirement.

Optionally, the TOS and the ROS may run on a same processor in a time division multiplexing manner. When the processor runs the TOS, the processor is referred to as a secure world processor. When the processor runs the ROS, the processor is referred to as a normal world processor. The TOS and the ROS may also simultaneously run on different operating system kernels kernels of a processor.

Optionally, the TOS and the ROS may simultaneously share another physical resource. For example, as shown in FIG. 1, the TOS and the ROS may share physical resources such as a central processing unit (central processing unit, CPU), a graphics processing unit (graphics processing unit, GPU), a neural network processing unit (neural network processing unit, NPU), a read only memory (read only memory, ROM), peripherals, and a one time programmable memory (for example, an efuse).

Although security of the computing system is improved by using the trustzone technology, as a quantity of key services increases, a code amount in the secure world isolated by a trustzone increases. As a result, the trusted computing base of the secure world is becoming larger, and the security world faces an increasingly larger attack surface. Therefore, a new technology is required to ensure security of the computing system.

One manner is to improve security of a computing device by using a secure boot technology. The secure boot technology is to verify an image level by level by using cryptography, to ensure that the computing device is trustable. Code that runs when the computing device is booted is usually written in a ROM, and a feature of the ROM device can ensure that the code is not tampered with. Only when an image to be run at a next level passes verification, the image is executed by the computing system. Therefore, it can be ensured that the running image is not illegally tampered with.

However, the secure boot technology can only ensure that the image running on the computing device is not tampered with. When an implementation of the system has vulnerabilities, an attacker may obtain higher permission by using these vulnerabilities, run malicious code, and even obtain access permission to the system. For example, the attacker may perform an attack in a secure boot process of the computing system, and bypass security verification in the boot process by using a code vulnerability in the boot process. For another example, in the secure boot process of the computing system, malicious software can access an entire memory space by using a permission configuration vulnerability. Therefore, when there are vulnerabilities in the implementation of the system, the secure boot technology cannot ensure the security of the computing device.

Figure 2:
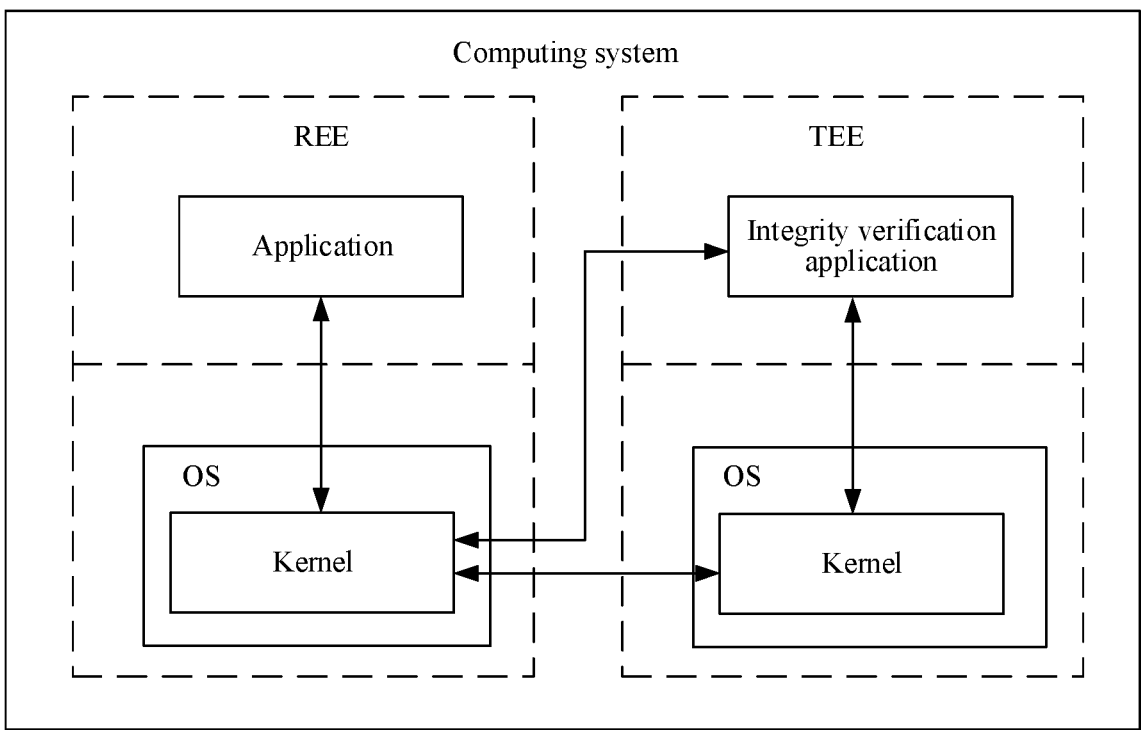
FIG. 2 is a schematic diagram of a security architecture of another computing system according to an embodiment of this application.

Another manner is to improve the security of the computing device by using a measurement technology. For example, FIG. 2 is a schematic diagram of a security architecture of a computing system. An integrity verification application is set in the TEE, and integrity measurement is performed on running of the REE by using the integrity verification application. For example, as shown in FIG. 2, a kernel-related operation such as an operation of modifying a TEE operating system or an operation of writing information into privileged code page in the REE may be intercepted by using the integrity verification application.

However, in this solution, the integrity verification application set in the TEE can measure only running of the REE, to ensure running security of the REE, and cannot discover a vulnerability that occurs in the TEE. In other words, in this solution, the TEE is used as a fully trusted system. However, it can be learned from the foregoing descriptions that the TEE is not always secure. For example, a fingerprint recognition function of a user can be cracked and fingerprint information of the user can be smoothly stolen by using a security vulnerability of an Android system mentioned in Black Hat conference Blackhat. Therefore, if only the REE is measured, and the TEE is not measured, security of the TEE is low. In addition, this solution cannot measure a boot process of the computing system, and may cause a vulnerability in the boot process of the computing system to be exploited by the attacker.

To resolve a problem in the conventional technology that the security of the computing system is low because the boot process of the computing system cannot be measured, an embodiment of this application provides a terminal chip. A security subsystem in the terminal chip may perform integrity measurement on a boot process of a computing subsystem, to ensure security of the boot process of the computing subsystem.

Figure 3:
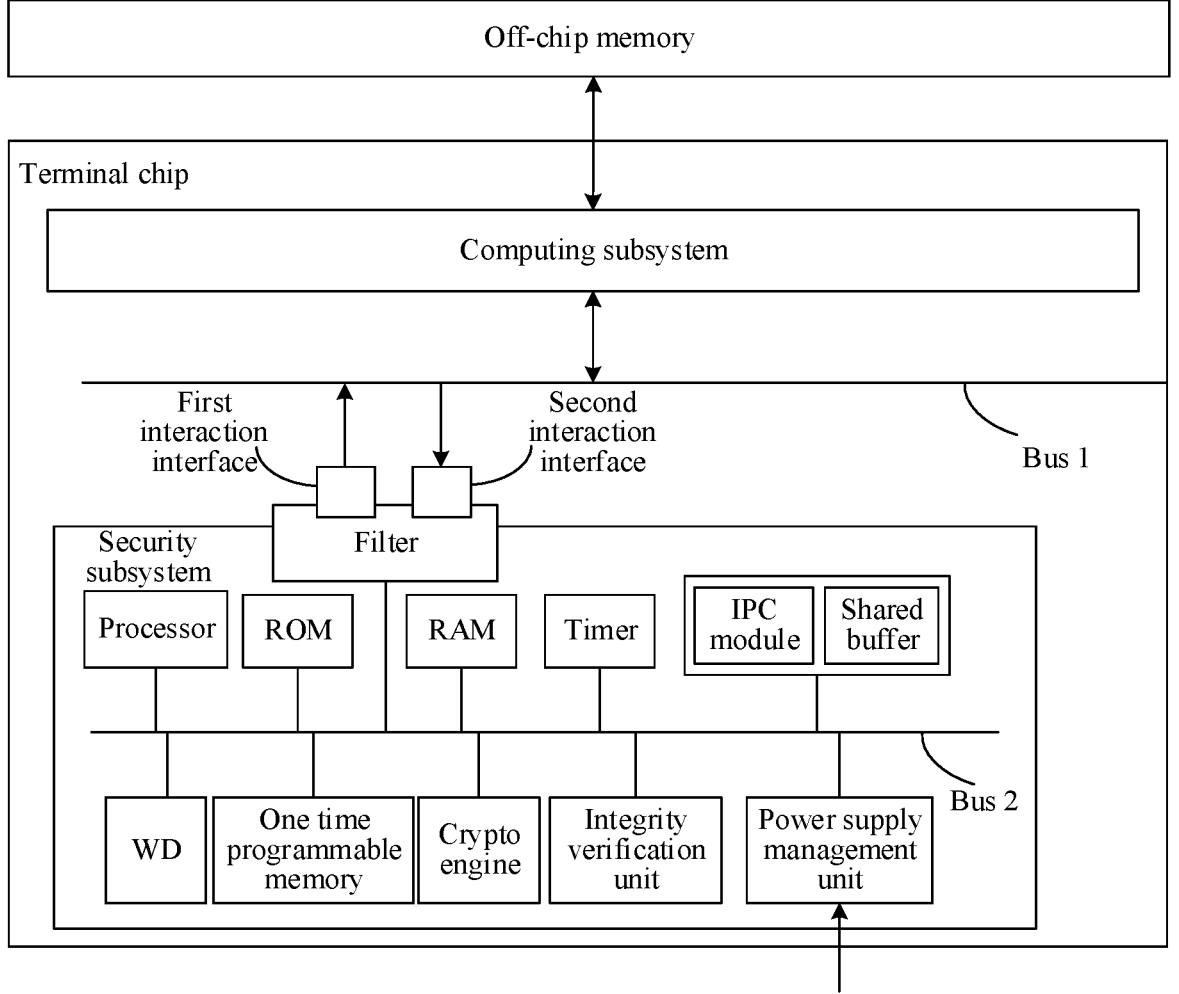
FIG. 3 is a schematic diagram of an architecture of a terminal device according to an embodiment of this application.

FIG. 3 is a schematic diagram of an architecture of a terminal device according to an embodiment of this application. The terminal device includes a terminal chip and an off-chip memory. A security subsystem and a computing subsystem are disposed in the terminal chip. The security subsystem is configured to measure the computing subsystem. A boot time of the security subsystem is earlier than a boot time of the computing subsystem. As shown in FIG. 3, the security subsystem includes: an integrity verification unit. The integrity verification unit is configured to perform integrity measurement on data in a boot process of the computing subsystem.

Optionally, in this embodiment of this application, a function of the integrity verification unit may be implemented through a hardware circuit, or may be implemented by using a software program. This is not limited in embodiments of this application.

For example, after the security subsystem is booted, the computing subsystem is booted. Because the boot time of the security subsystem is earlier than the boot time of the computing subsystem, the security subsystem may measure the data in the boot process of the computing subsystem, to determine whether the computing subsystem is maliciously attacked in the boot process, so that security of the boot process of the computing subsystem can be improved.

For example, the computing subsystem may include an REE and a TEE. That the integrity verification unit performs integrity measurement on the data in the boot process of the computing subsystem may include performing integrity measurement on data in a boot process of the REE, and may also include performing integrity measurement on data in a boot process of the TEE.

For example, the computing subsystem includes the REE and the TEE. After the security subsystem is powered on and booted, the integrity measurement may be performed on data in a power-on boot process of the TEE and data in a power-on boot process of the REE in sequence, to ensure the security of the boot process of the computing subsystem.

Optionally, as shown in FIG. 3, the security subsystem may further include a ROM and a processor. The ROM is configured to store a computer program when the security subsystem is powered on. The processor is configured to run the computer program stored in the ROM. The processor is further configured to run an operating system of the security subsystem. Optionally, the processor may be a central processing unit CPU, or may be an application-specific integrated circuit (application-specific integrated circuit, ASIC), or may be one or more integrated circuits configured to implement embodiments of this application, for example, one or more microprocessors (digital signal processors, DSPs) or one or more field programmable gate arrays (field programmable gate arrays, FPGAs). A specific form of the processor is not limited in embodiments of this application.

In this embodiment of this application, when the security subsystem is powered on, the processor of the security subsystem may execute computer program code stored in the ROM. In addition, in this embodiment of this application, because a power-on boot time of the security subsystem is earlier than a power-on boot time of the computing subsystem, after being powered on and booted, the security subsystem may perform integrity measurement on a power-on boot process of the computing subsystem, to ensure the security of the boot process of the computing subsystem.

Figure 4:
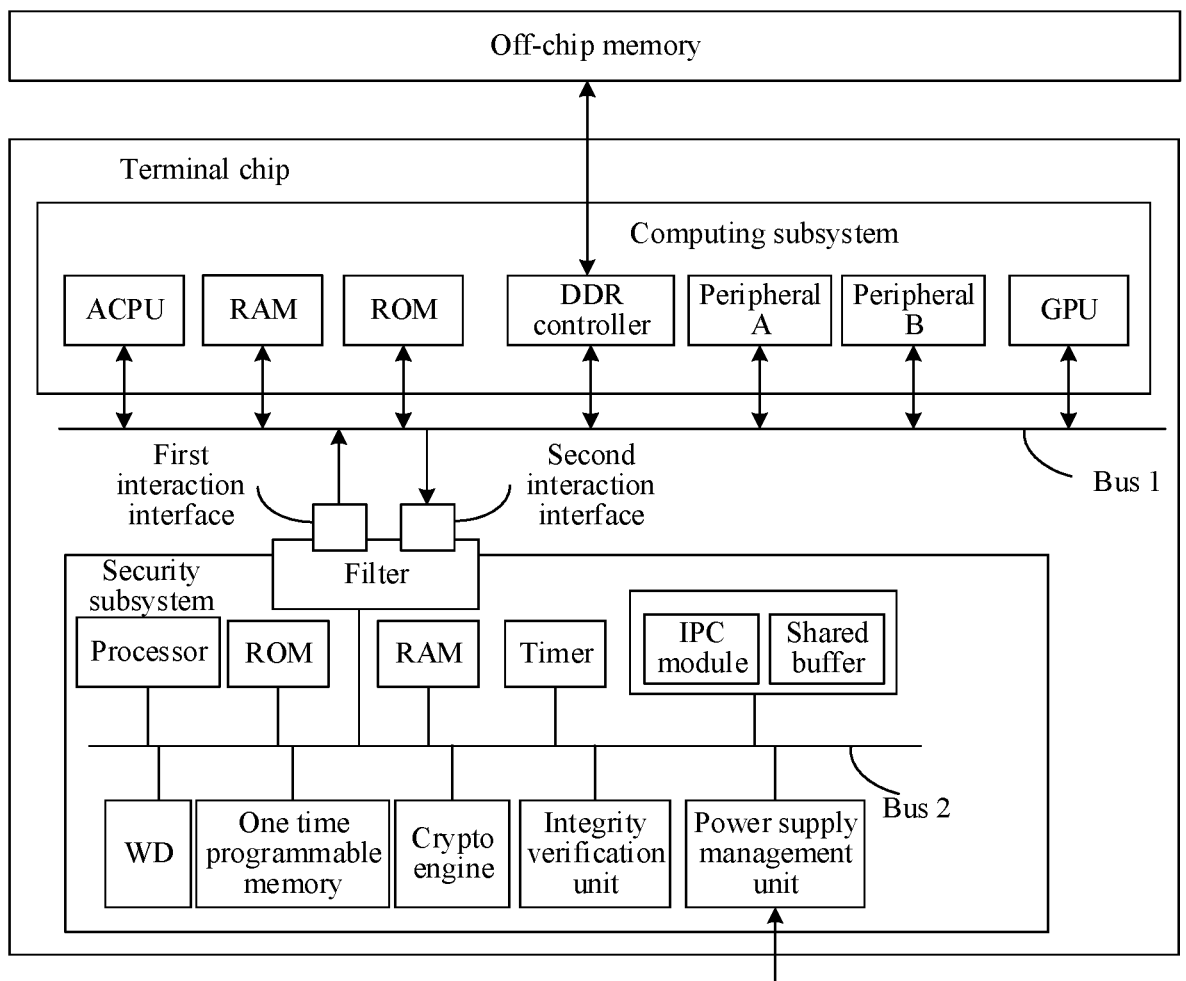
FIG. 4 is a schematic diagram of an architecture of another terminal device according to an embodiment of this application.

For example, the security subsystem may run in a closed execution environment, and the security subsystem may run user-defined firmware and an operating system. For example, as shown in FIG. 4, the computing subsystem includes hardware resources such as an application processor (application central processing unit, ACPU), a random access memory (Random Access Memory, RAM), a ROM, a memory controller, a GPU, and a peripheral. The security subsystem includes hardware resources such as a CPU, a RAM, and a ROM. That is, the hardware resources of the security subsystem and the hardware resources of the computing subsystem are independent of each other.

Figure 5:
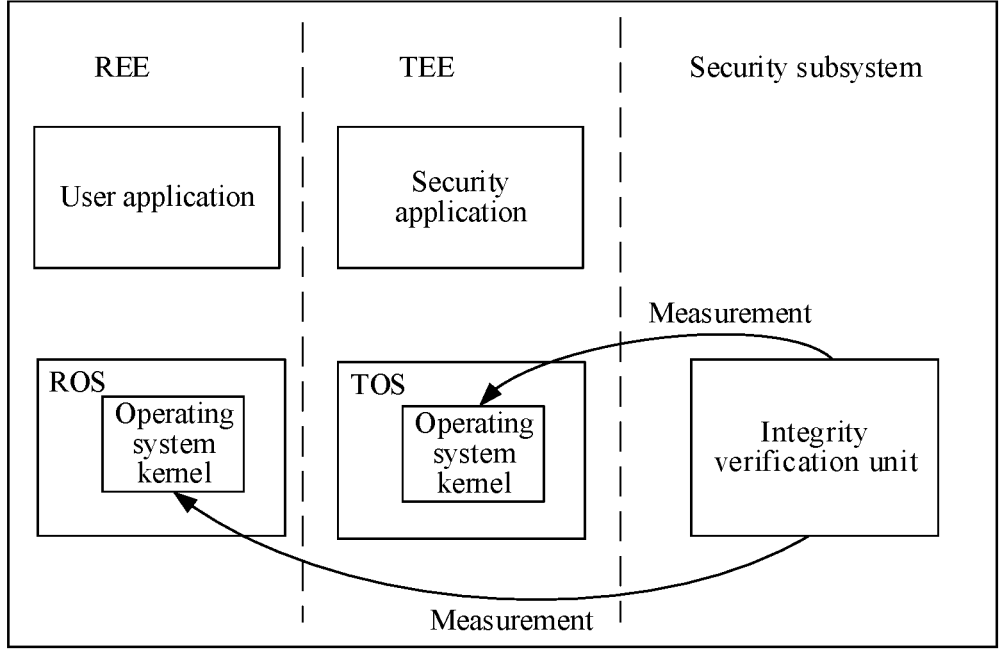
FIG. 5 is a schematic diagram of a software architecture of a terminal device according to an embodiment of this application.

For another example, FIG. 5 is a schematic diagram of a software architecture of a terminal device. As shown in FIG. 5, the computing subsystem may include the REE and the TEE. The security subsystem may run a user-defined operating system. The user-defined operating system may be different from an ROS run by the REE and a TOS run by the TEE. The integrity verification unit of the security subsystem may measure an operating system kernel of the TEE and an operating system kernel of the REE, to ensure secure running of the computing subsystem.

Optionally, a processor structure of the security subsystem may be the same as or different from a processor structure of the computing subsystem. For example, the processor architecture of the security subsystem may be an ARM architecture, and the processor architecture of the computing subsystem may be an X86 architecture. For another example, both the processor architecture of the security subsystem and the processor architecture of the computing subsystem may be the ARM architecture.

It may be understood that, because the hardware resource of the security subsystem and the hardware resource of the computing subsystem are independent of each other, and the security subsystem may run the user-defined operating system, before the computing subsystem is booted, the processor of the security subsystem may run the user-defined operating system to boot the security subsystem. After the security subsystem is booted, the integrity verification unit of the security subsystem may perform integrity measurement on data running in the boot process of the computing subsystem, to ensure the security of the boot process of the computing subsystem.

Optionally, the security subsystem may further include a first interaction interface, and the security subsystem may access all resources of the computing subsystem through the first interaction interface. For example, the security subsystem may read all the resources (for example, resources in the RAM and a register of the computing subsystem) in the computing subsystem through the first interaction interface and a bus 1 of the computing subsystem. Optionally, the security subsystem may further read a resource in the off-chip memory through the first interaction interface.

For example, the security subsystem may read security-related data such as a to-be-executed image and memory mapping page table information in the RAM of the computing subsystem or the off-chip memory (for example, a double data rate (double data rate, DDR) synchronous dynamic random access memory). For another example, the security subsystem may read security-related data such as a reset vector base address, a trustzone protection controller (trustzone protection controller, TZPC), a trustzone memory adapter (trustzone memory adapter, TZMA), a trustzone address space controller (trustzone address space controller, TZASC), and an exception vector table in the register of the computing subsystem.

Optionally, as shown in FIG. 3 or FIG. 4, the security subsystem may further include a crypto engine (crypto engine), where the crypto engine is configured to provide a cryptographic algorithm. The integrity verification unit is specifically configured to invoke the cryptographic algorithm provided by the crypto engine and perform integrity measurement on the data in the boot process of the computing subsystem.

For example, the crypto engine is configured to provide an encryption algorithm such as a hash algorithm or a message authentication code (message authentication code, MAC) algorithm. For example, the integrity verification unit may calculate a hash value of the data in the boot process of the computing subsystem by invoking the hash algorithm provided by the crypto engine. For another example, the integrity verification unit may calculate a MAC value of the data in the boot process of the computing subsystem by invoking the MAC algorithm provided by the crypto engine.

Optionally, as shown in FIG. 3 or FIG. 4, the security subsystem may further include: a random access memory RAM, where the RAM is configured to store reference values corresponding to the data in the boot process and data in a running process of the computing subsystem. Optionally, the RAM may be further configured to temporarily store another information required when the security subsystem runs.

Optionally, the integrity verification unit is specifically configured to invoke the crypto engine, calculate a feature value of the data in the boot process of the computing subsystem, and compare the feature value with the reference value stored in the RAM, to indicate whether the computing subsystem is attacked. It may be understood that, if the feature value is consistent with the reference value stored in the RAM, it indicates that the computing subsystem is not attacked. If the feature value is inconsistent with the reference value stored in the RAM, it indicates that the computing subsystem is attacked. When the security subsystem determines that the computing subsystem is attacked, the security subsystem may reset the computing subsystem, or may perform another exception handling. A specific manner of exception handling when the computing subsystem is attacked is not limited in embodiments of this application. The following embodiment is described by using only an example in which the security subsystem resets the computing subsystem when the computing subsystem is attacked.

Optionally, when the integrity verification unit invokes the hash algorithm provided by the crypto engine and calculates the feature value of the data in the boot process, the feature value is a hash value. Optionally, when the integrity verification unit invokes the MAC algorithm provided by the crypto engine and calculates the feature value of the data in the boot process, the feature value is a MAC value. In this embodiment of this application, a specific type of the cryptographic algorithm provided by the crypto engine is not limited. In the following embodiments, only an example in which the cryptographic algorithm provided by the crypto engine is the hash algorithm is used for description.

Optionally, the processor is further configured to send a first indication signal to the computing subsystem when the integrity verification unit determines that the feature value is the same as the reference value, where the first indication signal indicates that the computing subsystem is not attacked. For example, the first indication signal may be a hardware signal.

Optionally, when the integrity verification unit determines that the feature value is different from the reference value, the processor is further configured to send indication information to a server, where the indication information indicates that the computing subsystem is attacked; or send a second indication signal to the computing subsystem, where the second indication signal is used to reset the computing subsystem. For example, the second indication signal may be a hardware signal.

Optionally, the data in the boot process of the computing subsystem may include data that affects secure running of the computing subsystem and that is in the boot process of the computing subsystem. For example, the data in the boot process of the computing subsystem may include, but not limited to: executed kernel code, a memory mapping page table, security configuration information of the REE and the TEE, and the like.

For example, after a terminal is powered on, the security subsystem is first powered on and booted, and the security subsystem may ensure boot security of the security subsystem by verifying the boot. After the security subsystem is booted, the computing subsystem starts to perform secure boot. In the boot process of the computing subsystem, the integrity verification unit of the security subsystem may read data running in the secure boot process of the computing subsystem, invoke the crypto engine, calculate a hash value of the data, and compare the hash value with a reference value. If the comparison succeeds (the hash value is the same as the reference value), the security subsystem sends, to the computing subsystem, a first indication signal indicating that the computing subsystem is not attacked. After receiving the first indication signal, the computing subsystem continues to perform a next boot process. If the comparison fails (the hash value is different from the reference value), the security subsystem determines that the computing subsystem has been attacked, and the security subsystem may directly reset the computing subsystem, so as to ensure that sensitive information (for example, a key) of the computing subsystem is not leaked. The security subsystem may alternatively send indication information to a server, to notify the server that the computing subsystem is attacked, so that a supplier can fix a vulnerability in the computing subsystem in time.

Optionally, if the comparison succeeds (the feature value is the same as the reference value), the security subsystem may alternatively not send, to the computing subsystem, a first indication signal indicating that the computing subsystem is not attacked. That is, when the computing subsystem is not attacked, the computing subsystem may execute the boot process step by step regardless of a result of integrity measurement of the security subsystem in the boot process, until the computing subsystem is attacked, the security subsystem resets the computing subsystem.

It may be understood that in the terminal chip provided in this embodiment of this application, because the boot time of the security subsystem is earlier than the boot time of the computing subsystem, and the security subsystem can access all the resources of the computing subsystem, the security subsystem may perform integrity measurement on the boot process of the computing subsystem, to determine whether the computing subsystem is maliciously attacked in the boot process, so as to ensure security of the boot process of the computing subsystem.

Optionally, the integrity verification unit of the security subsystem is further configured to perform integrity measurement on data in a running process of the computing subsystem. For example, when the computing subsystem runs, a processor of the computing subsystem may run only the ROS, or may run only the TOS, or may run both the ROS and the TOS.

For example, that the integrity verification unit performs integrity measurement on the data in the running process of the computing subsystem may include performing integrity measurement on data in a running process of the REE, and may also include performing integrity measurement on data in a running process of the TEE.

Optionally, the data in the running process of the computing subsystem may include data that affects secure running of the computing subsystem and that is in the running process of the computing subsystem. For example, the data in the running process of the computing subsystem may include, but not limited to: executed kernel code, code of an application, a memory mapping page table, security configuration information of the REE and the TEE, and the like.

In an implementation, the integrity verification unit is configured to perform integrity measurement on the data during running of the computing subsystem when the computing subsystem is switched from a rich execution environment REE to a trusted execution environment TEE.

For example, in a running phase, when the computing subsystem is switched from the REE to the TEE, the security subsystem may read data during running of the computing subsystem, invoke the crypto engine, calculate a hash value of the data, and compare the hash value with a reference value pre-stored in the security subsystem. If the comparison succeeds, the security subsystem may send, to the computing subsystem, a first indication signal indicating that the computing subsystem is not attacked. After receiving the first indication signal, the computing subsystem may be switched to the TEE, and execute a security service. If the comparison fails, the security subsystem determines that the computing subsystem is attacked, and the security subsystem resets the computing subsystem, so as to ensure security of the TEE. Optionally, if the comparison succeeds, the security subsystem may alternatively not send, to the computing subsystem, a first indication signal indicating that the computing subsystem is not attacked. That is, when the computing subsystem is not attacked, the computing subsystem may be switched from the REE to the TEE and execute a service of the TEE regardless of a result of integrity measurement result of the security subsystem, until the computing subsystem is attacked, the security subsystem resets the computing subsystem.

In another implementation, as shown in FIG. 3 or FIG. 4, the security subsystem may further include: a timer. The integrity verification unit may further periodically perform integrity measurement on the data during running of the computing subsystem based on the timer.

Optionally, the data during running of the computing subsystem may include only data during running of the TEE, or may include only data during running of the REE, or may include both data during running of the TEE and data during running of the REE. For example, when the security subsystem periodically performs integrity measurement on the computing subsystem, if the processor of the computing subsystem currently runs only the TOS, the security subsystem performs integrity measurement on the data during running of the TEE. For another example, when the security subsystem periodically performs integrity measurement on the computing subsystem, if the processor of the computing subsystem currently runs only the ROS, the security subsystem performs integrity measurement on the data during running of the REE. For another example, when the security subsystem periodically performs integrity measurement on the computing subsystem, if the processor of the computing subsystem currently runs both the ROS and the TOS, the security subsystem performs integrity measurement on the data during running of the REE and the data during running of the TEE.

For example, in the running phase, the security subsystem may periodically perform integrity measurement on the data in the running process of the computing subsystem. For example, the processor of the computing subsystem currently runs both the ROS and the TOS. The security subsystem may periodically read the data during running of the REE and the TEE, and perform integrity measurement on the REE and the TEE. It may be understood that, for a method in which the security subsystem performs integrity measurement on the REE and the TEE, refer to the foregoing content. Details are not described herein again.

It may be understood that in the terminal chip provided in this embodiment of this application, the security subsystem may not only perform integrity measurement on the boot process of the computing subsystem, but also perform integrity measurement on the data in the running process of the computing subsystem. Therefore, a full life cycle of the computing subsystem can be measured, to ensure secure running of the computing subsystem.

Optionally, as shown in FIG. 3 or FIG. 4, the security subsystem may further include a shared buffer, where the shared buffer is used for communication between the computing subsystem and the security subsystem. For example, the shared buffer includes an Inbox and an Outbox, where the Inbox and the Outbox are generally on-chip buffers (buffer) of the SoC.

Optionally, as shown in FIG. 3 or FIG. 4, the security subsystem may further include an inter-process communication (inter-process communication, IPC) module. The IPC module is configured to send an interrupt request to the ACPU of the computing subsystem or the processor of the security subsystem, and the shared buffer is configured to buffer communication data for the application processor ACPU of the computing subsystem or the processor of the security subsystem. Optionally, the security subsystem may further include a second interaction interface. The computing subsystem may read data from the shared buffer of the security subsystem through the second interaction interface, or may write data into the shared buffer of the security subsystem through the second interaction interface.

For example, when the computing subsystem communicates with the security subsystem, the computing subsystem writes data into the shared buffer of the security subsystem through the second interaction interface. After completing the write action, the ACPU of the computing subsystem sends an interrupt request to the processor of the security subsystem through the IPC module. After receiving the interrupt request, the processor of the security subsystem reads the data from the shared buffer to complete communication. When the security subsystem communicates with the computing subsystem, the security subsystem writes data into the shared buffer. After completing the write action, the processor of the security subsystem sends an interrupt request to the ACPU of the computing subsystem through the IPC module. After receiving the interrupt request, the ACPU of the computing subsystem reads the data from the shared buffer through the second interaction interface, to complete communication.

Optionally, as shown in FIG. 3 or FIG. 4, the security subsystem may further include a filter (filter), where the filter is configured to intercept a first access operation of the computing subsystem, where the first access operation is used to request to access other resources than the shared buffer in the security subsystem. That is, the shared buffer is a unique resource that can be accessed by the computing subsystem in the security subsystem. When the computing subsystem accesses other resources than the shared buffer in the security subsystem, the filter may intercept these access operations, to ensure that the computing subsystem cannot read or change information in the security subsystem, thereby ensuring credibility of the security subsystem. For example, the computing subsystem cannot rewrite data stored in a random access memory RAM of the security subsystem. It may be understood that, in this embodiment of this application, the security subsystem is a system with a simple function, has a small trusted computing base, and has high credibility.

Optionally, the filter in the security subsystem is further configured to intercept a second access operation of the security subsystem, where the second access operation is used to request to write data into the computing subsystem. That is, in this embodiment of this application, the security subsystem may read all the resources in the computing subsystem, but cannot write data into the computing subsystem, to avoid exposing the data in the security subsystem to the computing subsystem, thereby further improving the credibility of the security subsystem.

Optionally, once the security subsystem is powered on and booted, an external power supply management unit cannot perform operations such as power-off, reset, and clock status change on the security subsystem. Otherwise, the security subsystem may be powered off, and cannot measure the computing subsystem, resulting in reduction of security of the computing subsystem. To resolve this problem, in a first implementation, the security subsystem is directly powered by using an independent clock and a power supply, and is not controlled by the external power supply management unit. In a second implementation, the external power supply management unit can perform power-on or power-off control on the security subsystem only after the security subsystem sends a hardware signal to the external power supply management unit to indicate the external power supply management unit to perform power-on or power-off control on the security subsystem.

Optionally, corresponding to the first implementation, as shown in FIG. 4, the security subsystem may further include a power supply clock management unit, where the power supply clock management unit is configured to perform power-on or power-off control on the security subsystem. In this implementation, because the power supply clock management unit that manages power-on or power-off of the security subsystem is independently disposed in the security subsystem, power-on or power-off of the security subsystem may not be controlled by the external power supply management unit. Therefore, the external power supply management unit cannot perform power-off control on the security subsystem. In addition, in this implementation, when the security subsystem periodically performs integrity measurement on the running process of the computing subsystem, power-on or power-off control may be periodically performed on the security subsystem by using the power supply clock management unit, thereby reducing energy consumption of the security subsystem and saving power.

Optionally, corresponding to the second implementation, the processor is further configured to send a third indication signal to the external power supply management unit, where the third indication signal indicates the external power supply management unit to perform power-on or power-off control on the security subsystem. In this implementation, the external power supply management unit can perform power-off control on the security subsystem only after receiving the third indication signal from the security subsystem, to ensure security of the computing subsystem in the full life cycle.

Optionally, to avoid a problem that security of the computing subsystem is poor because the security subsystem stops measuring the computing subsystem after being suspended, the security subsystem in this embodiment of this application may further include a watchdog Watchdog. The watchdog is configured to reset the security subsystem and the computing subsystem when the security subsystem is suspended. It may be understood that if the security subsystem is suspended, no one kicks the dog. After the watchdog times out, resetting of the entire system is performed, thereby preventing the computing subsystem from being attacked when running in an unprotected state. Optionally, the resetting the security subsystem and the computing subsystem includes rebooting the security subsystem and the computing subsystem.

Optionally, as shown in FIG. 4, the security subsystem may further include a one time programmable (one time programmable, OTP) memory. The one time programmable memory is configured to store configuration information of the security subsystem and some key keys. For example, the one time programmable memory may be an efuse.

It may be understood that, the power-on boot time of the security subsystem provided in this embodiment of this application is earlier than the power-on boot time of the computing subsystem, so that the security subsystem can perform integrity measurement on the boot process and the running process of the computing subsystem, that is, the security subsystem can measure the full life cycle of the computing subsystem, to ensure security of the full life cycle of the computing subsystem. In addition, when measuring the computing subsystem, the security subsystem may measure not only the REE, but also the TEE, to ensure secure running of the entire computing subsystem.

Figure 6:
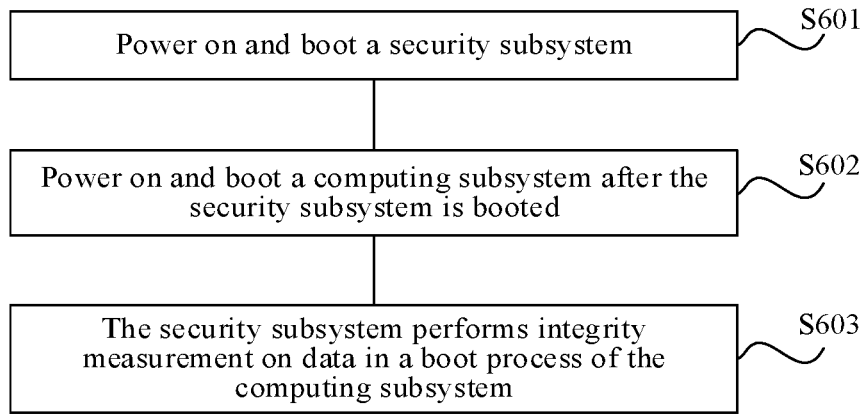
FIG. 6 is a schematic flowchart of a measurement method for a terminal chip according to an embodiment of this application.

As shown in FIG. 6, an embodiment of this application further provides a measurement method for a terminal chip. The terminal chip may be the terminal chip shown in FIG. 3 or FIG. 4. The measurement method includes the following steps.

S601: Power on and boot a security subsystem.

A boot time of the security subsystem is earlier than a boot time of a computing subsystem. For example, the computing subsystem is booted after the security subsystem is booted.

Optionally, when the security subsystem is booted, the security subsystem may verify an image level by level by using a secure boot technology, to ensure security of a boot process of the security subsystem.

Optionally, in step S601, the processor in the security subsystem shown in FIG. 4 may execute code stored in the ROM, to boot the security subsystem.

S602: Power on and boot the computing subsystem after the security subsystem is booted.

Optionally, after the security subsystem is booted, the computing subsystem is booted, so that the security subsystem can perform integrity measurement on a boot process of the computing subsystem.

Optionally, when the computing subsystem is booted, the image may be verified level by level by using the secure boot technology, to ensure security of the boot process of the computing subsystem. In addition, the security subsystem performs integrity measurement on the boot process of the computing subsystem, so as to further determine whether the boot process of the computing subsystem is maliciously attacked or tampered with.

Optionally, the computing subsystem may include an REE and a TEE. The booting the computing subsystem in step S602 may include: booting the TEE and the REE. For example, when the computing subsystem is booted, the TEE may be first booted, and then the REE is booted.

S603: The security subsystem performs integrity measurement on data in a boot process of the computing subsystem.

It may be understood that, in step S603, the integrity verification unit of the security subsystem shown in FIG. 4 may invoke the crypto engine and perform integrity measurement on the data in the boot process of the computing subsystem. For content of the data in the boot process of the computing subsystem and a specific implementation in which the security subsystem performs integrity measurement on the data in the boot process of the computing subsystem, refer to the foregoing embodiments, and details are not described herein again.

Optionally, that the security subsystem performs integrity measurement on the data in the boot process of the computing subsystem in step S603 includes: The security subsystem calculates a feature value of the data in the boot process of the computing subsystem, and compares the feature value with a reference value.

For example, after the security subsystem is booted, the computing subsystem starts to perform secure boot. In the boot process of the computing subsystem, the security subsystem may first perform integrity measurement on a boot process of the TEE, and then perform integrity measurement on a boot process of the REE.

It may be understood that, in the measurement method for a terminal chip provided in this embodiment of this application, the computing subsystem is booted after the security subsystem is booted, so that the security subsystem can perform integrity measurement on the boot process of the computing subsystem, to ensure security of the boot process of the computing subsystem. In addition, when measuring the boot process of the computing subsystem, the security subsystem may not only perform integrity measurement on the boot process of the REE, but also perform integrity measurement on the boot process of the TEE, thereby ensuring security of the boot process of the entire computing subsystem.

Optionally, if the feature value of the data in the boot process of the computing subsystem is the same as the reference value, the security subsystem determines that the integrity measurement succeeds. If the feature value of the data in the boot process of the computing subsystem is different from the reference value, the security subsystem determines that the integrity measurement fails.

Figure 7:
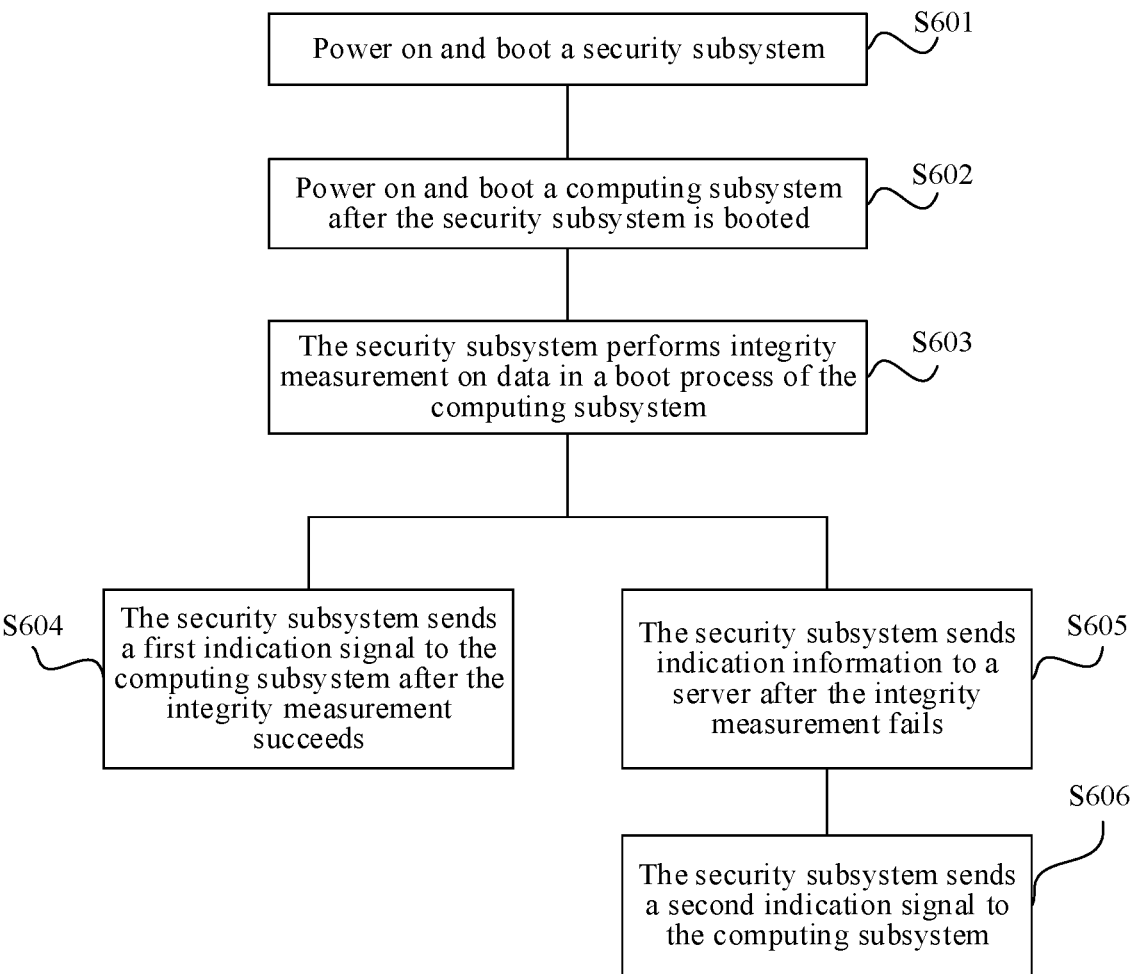
FIG. 7 is a schematic flowchart of another measurement method for a terminal chip according to an embodiment of this application.

Optionally, as shown in FIG. 7, when the security subsystem determines that the integrity measurement succeeds in step S603, the method may further include step S604; or when the security subsystem determines that the integrity measurement fails in step S603, the method may further include step S605 and step S606.

S604: The security subsystem sends a first indication signal to the computing subsystem when the integrity measurement succeeds.

The first indication signal indicates that the computing subsystem is not attacked.

Optionally, that the integrity measurement succeeds means that comparison between the reference value and the feature value of the data in the boot process of the computing subsystem succeeds, that is, the feature value of the data is the same as the reference value.

Optionally, when the integrity measurement succeeds, the security subsystem sends the first indication signal to the computing subsystem, to indicate that the computing subsystem is not attacked.

Optionally, when the security subsystem determines that the integrity measurement succeeds, the security subsystem may alternatively not send, to the computing subsystem, the first indication signal indicating that the computing subsystem is not attacked. For example, when the computing subsystem is not attacked, the computing subsystem may execute the boot process step by step regardless of a result of integrity measurement of the security subsystem in the boot process, until the computing subsystem is attacked, the security subsystem resets the computing subsystem.

S605: The security subsystem sends indication information to a server when the integrity measurement fails.

The indication information indicates that the computing subsystem is attacked.

Optionally, that the integrity measurement fails means that the comparison between the reference value and the feature value of the data in the boot process of the computing subsystem fails, that is, the feature value of the data is different from the reference value.

It may be understood that when the security subsystem determines that the integrity measurement fails, the security subsystem sends the indication information to the server, to notify the server that the computing subsystem is attacked, so that a supplier can repair a vulnerability in the computing subsystem in time, thereby ensuring secure running of the computing subsystem.

S606: The security subsystem sends a second indication signal to the computing subsystem.

The second indication signal is used to reset the computing subsystem.

It may be understood that when the integrity measurement fails, the security subsystem determines that the computing subsystem is attacked, and the security subsystem may directly reset the computing subsystem, so as to ensure that sensitive information (for example, a key) of the computing subsystem is not leaked.

Figure 8:
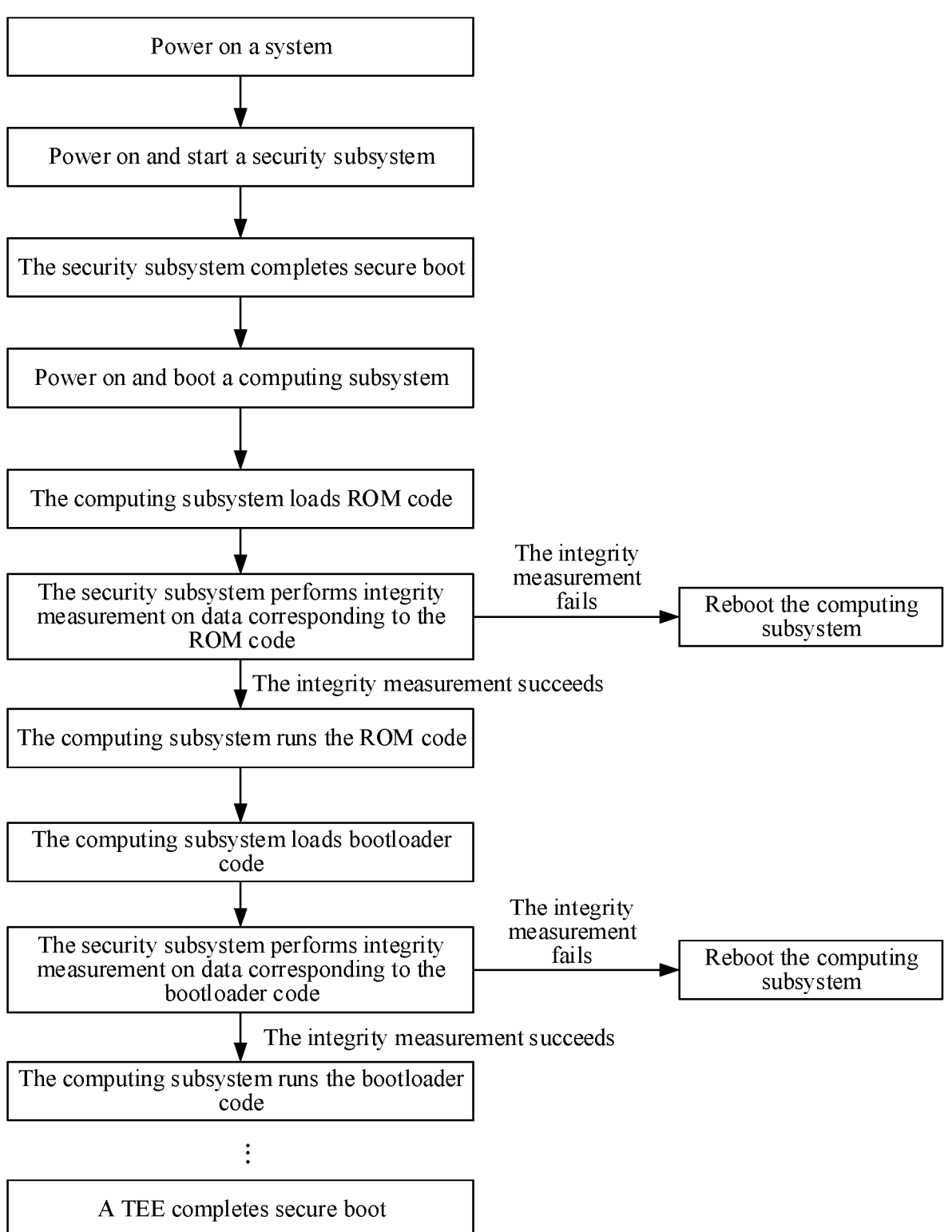
FIG. 8 is a schematic diagram of application of a measurement method for a terminal chip according to an embodiment of this application.

For example, the security subsystem performs integrity measurement on the boot process of the TEE. As shown in FIG. 8, after a system is powered on (for example, a terminal device is powered on), the security subsystem is first powered on and booted. After the security subsystem completes secure boot, the computing subsystem is powered on and booted, the computing subsystem loads ROM code, and the integrity verification unit of the security subsystem reads data such as the ROM code, code of a secure application, a memory mapping page table, and security configuration information of the TEE, and performs integrity measurement on the data. If the integrity measurement on the data corresponding to the ROM code fails, the computing subsystem is rebooted. If the integrity measurement on the data corresponding to the ROM code succeeds, the computing subsystem may continue to run the ROM code, and load a bootloader (a boot loader program of an operating system), and integrity measurement is further performed on data corresponding to the loaded bootloader. If the integrity measurement on the data corresponding to the loaded bootloader fails, the computing subsystem is rebooted. If the integrity measurement on the data corresponding to the loaded bootloader succeeds, the computing subsystem continues to run the bootloader code. In this way, the boot process is executed in sequence until the secure boot of the TEE is completed.

According to the measurement method provided in this embodiment of this application, the computing subsystem is booted after the security subsystem is booted, so that the security subsystem can perform integrity measurement on the boot process of the computing subsystem, to ensure security of the boot process of the computing subsystem. In addition, when measuring the boot process of the computing subsystem, the security subsystem may not only perform integrity measurement on the boot process of the REE, but also perform integrity measurement on the boot process of the TEE, thereby ensuring security of the boot process of the entire computing subsystem. In the method, when the security subsystem determines that the computing subsystem is attacked, the security subsystem sends the indication information to the server, to notify the server that the computing subsystem is attacked, so that a supplier can repair a vulnerability in the computing subsystem in time, thereby ensuring secure running of the computing subsystem. In addition, when the computing subsystem is attacked, the computing subsystem is reset to ensure that sensitive information of the computing subsystem is not leaked.

Figure 9:
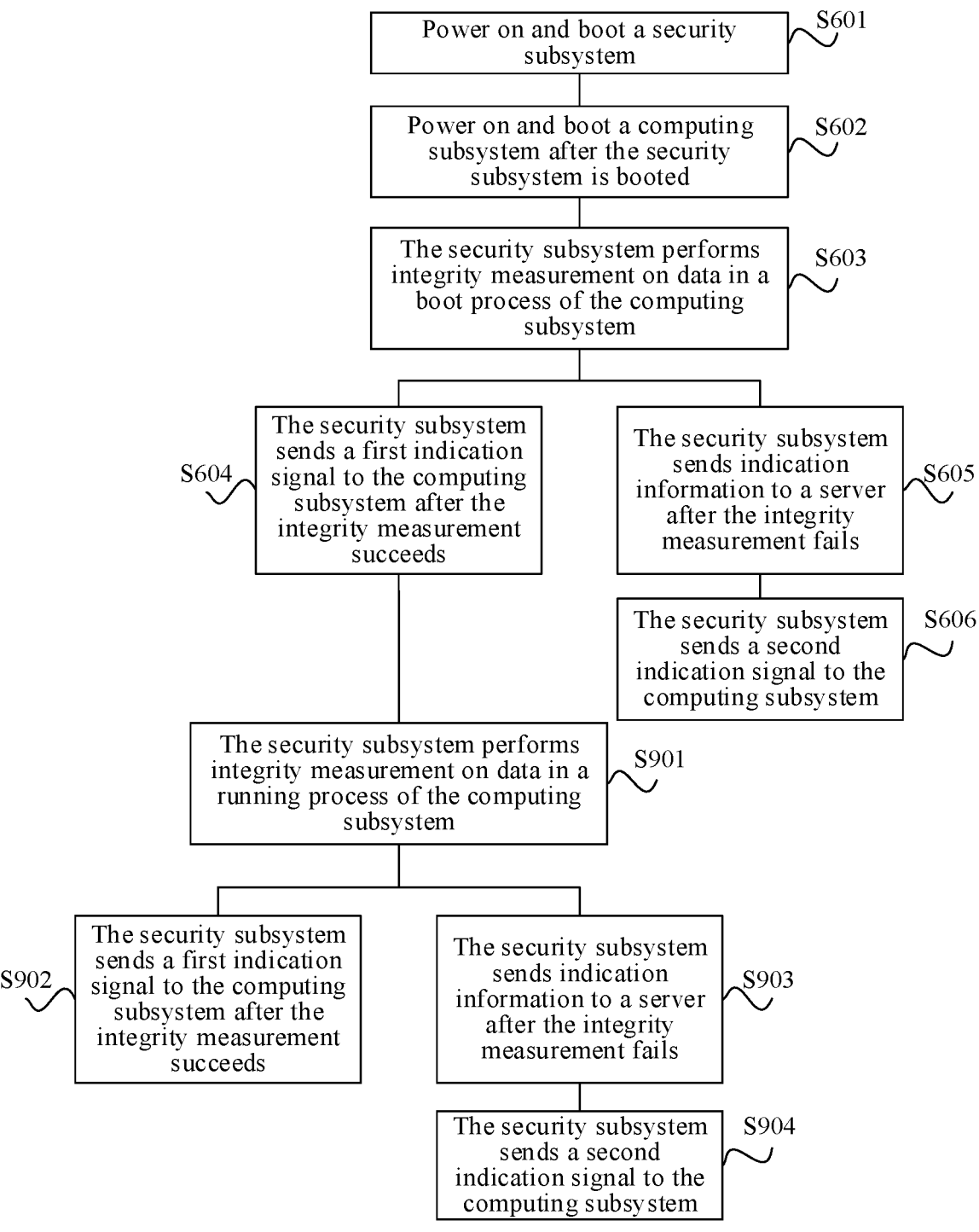
FIG. 9 is a schematic flowchart of another measurement method for a terminal chip according to an embodiment of this application.

As shown in FIG. 9, an embodiment of this application further provides a measurement method for a terminal chip. After step S604, the measurement method may further include the following steps.

S901: The security subsystem performs integrity measurement on data in a running process of the computing subsystem.

It may be understood that, in step S901, the integrity verification unit of the security subsystem shown in FIG. 4 may invoke the crypto engine and perform integrity measurement on the data in the running process of the computing subsystem. For content of the data in the running process of the computing subsystem and a specific implementation in which the security subsystem performs integrity measurement on the data in the running process of the computing subsystem, refer to the foregoing embodiments, and details are not described herein again.

Optionally, that the security subsystem performs integrity measurement on the data in the running process of the computing subsystem in step S901 includes: The security subsystem calculates a feature value of the data in the running process of the computing subsystem, and compares the feature value with a reference value.

Optionally, when the security subsystem performs integrity measurement on the data in the running process of the computing subsystem in step S901, the security subsystem may periodically perform integrity measurement on the data in the running process of the computing subsystem. The computing subsystem may include only an REE, or include only a TEE, or include both a TEE and an REE.

It may be understood that, in the measurement method for a terminal chip provided in this embodiment of this application, the computing subsystem is booted after the security subsystem is booted, so that the security subsystem can perform integrity measurement on the boot process and the running process of the computing subsystem, that is, the security subsystem can measure the full life cycle of the computing subsystem, to ensure security of the full life cycle of the computing subsystem. In addition, when measuring the computing subsystem, the security subsystem may not only perform integrity measurement on the REE, but also perform integrity measurement on the TEE, to ensure security of the entire computing subsystem.

Optionally, as shown in FIG. 9, when the security subsystem determines that the integrity measurement succeeds in step S901, the method may further include step S902; or when the security subsystem determines that the integrity measurement fails in step S901, the method may further include step S903 and step S904.

S902: The security subsystem sends a first indication signal to the computing subsystem when the integrity measurement succeeds.

The first indication signal indicates that the computing subsystem is not attacked.

Optionally, that the integrity measurement succeeds means that comparison between the reference value and the feature value of the data in the running process of the computing subsystem succeeds, that is, the feature value of the data is the same as the reference value.

Optionally, when the integrity measurement succeeds, the security subsystem sends the first indication signal to the computing subsystem, to indicate that the computing subsystem is not attacked.

Optionally, when the security subsystem determines that the integrity measurement succeeds, the security subsystem may alternatively not send, to the computing subsystem, the first indication signal indicating that the computing subsystem is not attacked. For example, when the computing subsystem is not attacked, the computing subsystem may execute the boot process step by step regardless of a result of integrity measurement of the security subsystem in the running process, until the computing subsystem is attacked, the security subsystem resets the computing subsystem.

S903: The security subsystem sends indication information to a server when the integrity measurement fails.

The indication information indicates that the computing subsystem is attacked.

Optionally, that the integrity measurement fails means that the comparison between the reference value and the feature value of the data in the running process of the computing subsystem fails, that is, the feature value of the data is different from the reference value.

It may be understood that when the security subsystem determines that the integrity measurement fails, the security subsystem sends the indication information to the server, to notify the server that the computing subsystem is attacked in the running process, so that a supplier can repair a vulnerability in the computing subsystem in time, thereby ensuring secure running of the computing subsystem.

S904: The security subsystem sends a second indication signal to the computing subsystem.

The second indication signal is used to reset the computing subsystem.

It may be understood that when the integrity measurement fails, the security subsystem determines that the computing subsystem is attacked, and the security subsystem may directly reset the computing subsystem, so as to ensure that sensitive information (for example, a key) of the computing subsystem is not leaked.

In the measurement method for a terminal chip provided in this embodiment of this application, the computing subsystem is booted after the security subsystem is booted, so that the security subsystem can perform integrity measurement on the boot process and the running process of the computing subsystem, that is, the security subsystem can measure the full life cycle of the computing subsystem, to ensure security of the full life cycle of the computing subsystem. In addition, when measuring the computing subsystem, the security subsystem may not only perform integrity measurement on the REE, but also perform integrity measurement on the TEE, to ensure security of the entire computing subsystem. In the method, when the security subsystem determines that the computing subsystem is attacked, the security subsystem sends the indication information to the server, to notify the server that the computing subsystem is attacked, so that a supplier can repair a vulnerability in the computing subsystem in time, thereby ensuring secure running of the computing subsystem. In addition, when the computing subsystem is attacked, the computing subsystem is reset to ensure that sensitive information of the computing subsystem is not leaked.

An embodiment of this application further provides a terminal device. The terminal device includes the terminal chip shown in FIG. 3 or FIG. 4 and an off-chip memory. The terminal chip is configured to read data from or write data into the off-chip memory.

Method or algorithm steps described in combination with the content disclosed in this application may be implemented by hardware, or may be implemented by a processor by executing software instructions. The software instructions may include a corresponding software module. The software module may be stored in a random access memory (Random Access Memory, RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium and write information into the storage medium. Certainly, the storage medium may be a component of the processor. The processor and the storage medium may be disposed in an ASIC. In addition, the ASIC may be located in a terminal interface device. Certainly, the processor and the storage medium may alternatively exist in the terminal interface device as discrete components.

A person skilled in the art should be aware that in the foregoing one or more examples, functions described in the present application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer storage medium and a communication medium, where the communication medium includes any medium that enables a computer program to be transmitted from one place to another. The storage medium may be any available medium accessible to a general-purpose or a dedicated computer.

The objectives, technical solutions, and benefits of the present application are further described in detail in the foregoing specific implementations. It should be understood that the foregoing descriptions are merely specific implementations of the present application, but are not intended to limit the protection scope of the present application. Any modification, equivalent replacement, or improvement made based on the technical solutions of the present application shall fall within the protection scope of the present application.

What is claimed is:

1. A terminal chip comprising a computing subsystem and a security subsystem, wherein the security subsystem is configured to measure the computing subsystem, a boot time of the security subsystem is earlier than a boot time of the computing subsystem, the security subsystem comprises:

an integrity verification unit configured to perform integrity measurement on data in a boot process of the computing subsystem;

a shared buffer comprised in an on-chip memory configured for communication between the computing subsystem and the security subsystem; and a filter configured to intercept a first access operation of the computing subsystem, wherein the first access operation is used to request to access resources other than the shared buffer in the security subsystem.

2. The terminal chip according to claim 1, wherein the security subsystem further comprises: a first interaction interface, and the security subsystem accesses resources of the computing subsystem through the first interaction interface.

3. The terminal chip according to claim 1, wherein the integrity verification unit is further configured to perform integrity measurement on data in a running process of the computing subsystem.

4. The terminal chip according to claim 3, wherein the integrity verification unit is specifically configured to perform integrity measurement on the data during running of the computing subsystem in response to that the computing subsystem is switched from a rich execution environment REE to a trusted execution environment TEE.

5. The terminal chip according to claim 3, wherein the security subsystem further comprises: a timer, wherein the timer is configured to perform timing; and the integrity verification unit is specifically further configured to periodically perform integrity measurement on the data during running of the computing subsystem based on the timer.

6. The terminal chip according to claim 1, wherein the filter is further configured to intercept a second access operation of the security subsystem, wherein the second access operation is used to request to write data into the computing subsystem.

7. The terminal chip according to claim 1, wherein the security subsystem further comprises: a read-only memory (ROM) and a processor, wherein the ROM is configured to store a computer program when the security subsystem is powered on; and the processor is configured to run the computer program stored in the ROM.

8. The terminal chip according to claim 1, wherein the security subsystem further comprises a crypto engine, wherein the crypto engine is configured to provide a cryptographic algorithm; and the integrity verification unit is specifically configured to invoke the cryptographic algorithm provided by the crypto engine and perform integrity measurement on the data in the boot process and data in a running process of the computing subsystem.

9. The terminal chip according to claim 1, wherein the security subsystem comprises a power supply clock management unit, and the power supply clock management unit is configured to perform power-on or power-off control on the security subsystem.

10. A method for a terminal chip, wherein the terminal chip comprises a computing subsystem and a security subsystem, and the method comprises:

powering on and booting the security subsystem, wherein the security subsystem is configured to measure the computing subsystem, and the security subsystem comprises a shared buffer comprised in an on-chip memory configured for communication between the computing subsystem and the security subsystem;

powering on and booting the computing subsystem after the security subsystem is booted;

performing, by the security subsystem, integrity measurement on data in a boot process of the computing subsystem; and intercepting, by the security subsystem, a first access operation of the computing subsystem, wherein the first access operation is used to access resources other than the shared buffer in the security subsystem.

11. The method according to claim 10, wherein the method further comprises:

performing, by the security subsystem, integrity measurement on data in a running process of the computing subsystem.

12. The method according to claim 11, wherein the performing, by the security subsystem, integrity measurement on data in a running process of the computing subsystem comprises:

performing, by the security subsystem, integrity measurement on the data during running of the computing subsystem in response to that the computing subsystem is switched from a rich execution environment REE to a trusted execution environment TEE.

13. The method according to claim 11, wherein the performing, by the security subsystem, integrity measurement on data in a running process of the computing subsystem comprises:

periodically performing, by the security subsystem, integrity measurement on the data in the running process of the computing subsystem.

14. The method according to claim 10, wherein the performing, by the security subsystem, integrity measurement on data in a boot process of the computing subsystem comprises:

calculating, by the security subsystem, a feature value of the data in the boot process of the computing subsystem, and comparing the feature value with a reference value, to indicate whether the computing subsystem is attacked.

15. The method according to claim 14, wherein in response to determining that the feature value is the same as the reference value, the method further comprises:

sending, by the security subsystem, a first indication signal to the computing subsystem, wherein the first indication signal indicates that the computing subsystem is not attacked.

16. The method according to claim 14, wherein in response to determining that the feature value is different from the reference value, the method further comprises:

sending, by the security subsystem, indication information to a server, wherein the indication information indicates that the computing subsystem is attacked; or sending, by the security subsystem, a second indication signal to the computing subsystem, wherein the second indication signal is used to reset the computing subsystem.

17. The method according to claim 10, wherein the method further comprises:

sending, by the security subsystem, a third indication signal to an external power supply management unit, wherein the third indication signal indicates the external power supply management unit to perform power-on or power-off control on the security subsystem.

18. The method according to claim 10, wherein the method further comprises:

intercepting, by the security subsystem, a second access operation of the security subsystem, wherein the second access operation is used to request to write data into the computing subsystem.

19. The method according to claim 10, wherein the security subsystem comprises a read-only memory (ROM) and a processor, and wherein powering on and booting the security subsystem comprises:

running, by the processor, a computer program stored in the ROM.

20. The method according to claim 10, wherein the security subsystem comprises a crypto engine configured to provide a cryptographic algorithm, and wherein performing the integrity measurement comprises:

invoking, by the security subsystem, the cryptographic algorithm provided by the crypto engine to perform the integrity measurement on the data in the boot process.

* * * * *